Dec. 7, 1965     C. B. WATSON, JR     3,221,940
TUBE SQUEEZER WITH AUTOMATICALLY
OPERATING CLOSURE MEMBER
Filed Dec. 18, 1963

INVENTOR.
CORNELIUS B. WATSON, JR.

BY *McCormick, Paulding & Huber*

ATTORNEYS

United States Patent Office 3,221,940
Patented Dec. 7, 1965

3,221,940
TUBE SQUEEZER WITH AUTOMATICALLY
OPERATING CLOSURE MEMBER
Cornelius B. Watson, Jr., P.O. Box 832, Madison, Conn.
Filed Dec. 18, 1963, Ser. No. 331,543
6 Claims. (Cl. 222—96)

This invention relates to tube squeezers for dispensing the contents of a collapsible tube, such as a conventional toothpaste tube, and deals more particularly with such a tube squeezer which includes an automatically operating closure member for preventing the leakage of material from the tube during periods of non-use.

The general object of the invention is to provide a tube squeezer having a closure member for preventing the leakage of material from the tube contained within the squeezer and which closure member is automatically moved to an open position in response to manual operation of the squeezer in accordance with the procedure normally followed in effecting the dispensing of tube material.

A more specific object of this invention is to provide a tube squeezer having an operating handle which is oscillatable about a given axis for the purpose of effecting the dispensing of tube material and which has combined therewith a closure member which is held in a closed position when the handle is in its normal or unoperated position and which is automatically released for movement to an open position in response to movement of the operating handle towards its operated position.

A still further object of this invention is to provide a tube squeezer having an efficient yet inexpensive means for preventing the leakage of material from the tube contained in the squeezer during periods of non-use.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
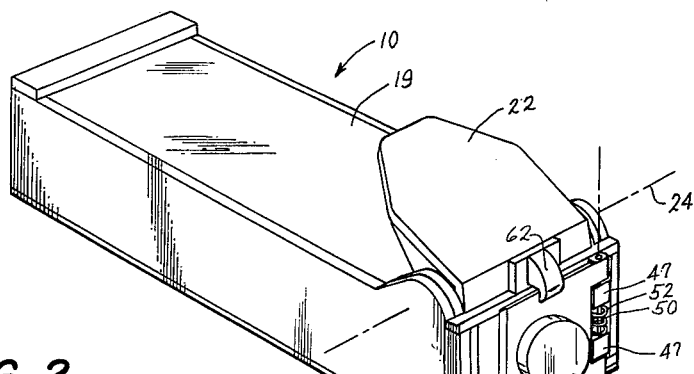
FIG. 1 is a perspective view showing a tube squeezer embodying the present invention and showing the closure member thereof in its closed position.
Figure 2:
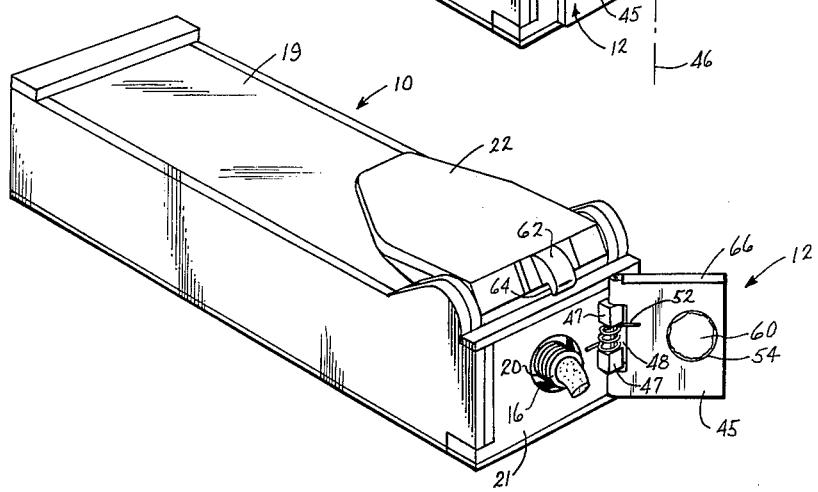
FIG. 2 is similar to FIG. 1 but shows the operating handle of the squeezer in its operated position and the closure member in its open position.
Figure 3:
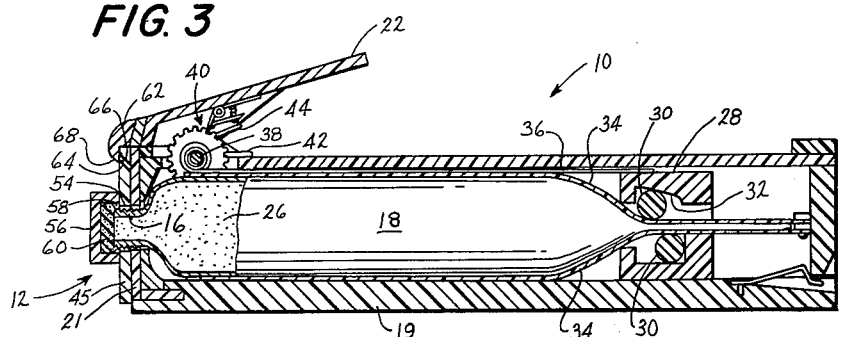
FIG. 3 is a vertical sectional view taken longitudinally through the tube squeezer of FIG. 1.

Turning to the drawing, the present invention is shown to comprise in general a tube squeezer 10 having a closure member 12 for movement between open and closed positions relative to the spout 16 of a tube 18 contained in the squeezer. FIGS. 1 and 3 show the closure member 12 in its closed position and FIG. 2 shows it in its open position.

The tube squeezer 10 may take various forms and shapes without departing from the present invention, and as illustrated it includes an elongated body 19 which is hollow and of generally rectangular transverse cross section and adapted to receive the tube 18 with the discharge spout 16 thereof extending through an opening 20 in its forward wall 21. Also at the forward end of the body 19 is an operating handle 22 which is supported for pivotal oscillating movement relative to the body about an axis, as indicated at 24 in FIG. 1, extending transversely of the body. FIGS. 1 and 3 show the handle in one limit of its movement relative to the body, and FIG. 2 shows it in the other limit of its movement. The operating handle position of FIGS. 1 and 3 is its normal or unoperated position, and the position of FIG. 2 may be referred to as its operated position. From FIGS. 2 and 3 it will be noted that the operated position is reached by depressing the rear end of the handle toward the body 19 or by moving it in the counterclockwise direction in FIG. 2. Connected with the operating handle 22 is a squeezing mechanism which operates in response to movement of the handle toward its operated position to squeeze the tube 18 to expel a portion of the material 26 contained in the tube from the spout 16.

The squeezing mechanism associated with the operating handle may take various forms without departing from the present invention. The illustrated tube squeezer 10, however, is or may be similar to the tube squeezer shown and described in detail in my co-pending application entitled "Collapsible Tube Squeezer," Serial No. 294,905, filed July 15, 1963, to which application reference is made for a more detailed description of this squeezing mechanism and other parts of the squeezer. For the present purposes, it is sufficient to note (see FIG. 3) that the squeezing mechanism includes a squeezer block 28 housed within the body 19 and adapted to receive two transversely disposed rollers 30, 30 located on opposite sides of the tube 18 and urged by an inclined wall 32 of the squeezer block into squeezing relationship with the tube, there being a flexible slab 34 interposed between each of the rollers 30, 30 and the tube. The squeezer block 28 is moved a short distance toward the front or forward end of the tube with each stroke of the operating handle 22 by means of a tape 36 fixed at one end to the block 28 and at its other end wound on a shaft 38. The latter shaft provides a pivotal support for the handle 22 and is rotated in response to movement of the handle 22 by a suitable ratchet mechanism indicated generally at 40. The handle 22 is biased toward the normal position of FIG. 3 by means of a helical torsion spring having two arms 42 and 44 which respectively engage the squeezer body 19 and the operating handle, the coil portion of the spring, not shown, surrounding the shaft 38.

Considering next the construction of the closure member 12, this unit consists of a flat plate 45 made of plastic or other suitable material and pivotally connected with the squeezer body for movement about an axis 46 (see FIG. 1) generally perpendicular to and spaced forwardly of the axis 24. In the illustrated construction, the pivotal connection is provided by two lugs 47, 47 which are glued or otherwise secured to the forward wall 20 and which are received within a notch 48 formed at one edge of the plate 45. A vertically extending pin 50 which defines the axis 46 passes through the plate 45 and the lugs 47, 47 to complete the connection. The two lugs are vertically spaced to form a gap which receives a helical torsion spring 52 that surrounds the pin and which has two arms one of which engages the forward wall 20 and the other of which engages the plate 45 to urge or bias the plate to the open position of FIG. 2.

The plate is provided with an aperture 54 for receiving the spout 16 when the closure member is in its closed position. Secured by glue or otherwise to the outer surface of the plate in a cup-shaped part 56 having a recess 58 which is aligned with the aperture 54. Contained within the common opening defined by the recess and the aperture is a pad 60 of resiliently compressible material such as foam rubber or the like, and by referring to FIG. 3 it will be noted that the arrangement is such that when the closure member is in its closed position the spout 16 extends into the common opening defined by the recess 58 and the aperture 54 and engages and compresses the pad 60 which accordingly seals the spout to prevent the escape of tube material.

In accordance with the invention, the closure member is operated in response to the movement of the operating handle and in such a manner that the member is released for automatic movement to its open position by the spring 56 in response to movement of the operating handle away from its normal position. To provide for this automatic release of the closure member, the operating handle has fixed thereto a latch member 62 having a rearwardly facing abutment surface 64 which engages the forward surface of the closure member as shown in FIG. 3 to hold the latter in the closed position against the bias force of the spring 52 when the operating handle 22 is in its closed position. From FIG. 3 it will be obvious that as the operating handle 22 is moved in the counterclockwise direction toward its operated position to effect the squeezing of the tube, the abutment surface 64 will be moved out of holding engagement with the closure member and the closure member released for movement to its open position. The closure member thereafter remains at its open position throughout the squeezing operation which may require one or more strokes of the operating handle. When the squeezing operation is completed, the closure member is moved by hand to its closed position, and in order to effect automatic re-engagement of the latch member with the closure member, the closure plate 45 has a generally rearwardly and downwardly inclined upper edge surface 66 and the latch member includes a generally similarly downwardly and rearwardly inclined surface 68. Therefore, when the closure member is moved toward its closed position, the engagement of the surface 66 with the surface 68 will cause the operating handle to be cammed slightly in the clockwise direction of FIG. 3 to permit the closure member to move beyond the latch member and into holding relationship with the latch member.

The invention claimed is:

1. A tube squeezer comprising a body for holding a tube to be squeezed and having a forward end from which end the spout of such a tube projects, a squeezing mechanism including an operating handle oscillatable in predetermined opposite directions relative to said body between a normal position and an operated position, a closure member carried by said body and movable relative thereto between a closed position at which it closes the spout of a tube contained in said body and an open position at which such spout is unblocked thereby, means for biasing said closure member toward its open position, a latch member movable relative to said body for releasably holding said closure member in its closed position, and means for moving said latch member in response to movement of said handle whereby said latch member is positioned to hold said closure member in its closed position when said handle is in its normal position and whereby said latch member is moved from said holding position to release said closure member for movement to its open position when said operating handle is moved toward its operated position.

2. A tube squeezer comprising a body for holding a tube to be squeezed and having a forward end from which end the spout of such a tube projects, a squeezing mechanism including an operating handle oscillatable in predetermined opposite directions relative to said body between a normal position and an operated position about an axis extending transversely of said body near the forward end thereof, a closure member pivotally supported on the forward end of said body and movable relative thereto between a closed position at which it closes the spout of a tube contained in said body and an open position at which such spout is unblocked thereby, means for biasing said closure member toward its open position, and a latch member for releasably holding said closure member in its closed position, said latch being fixed to said handle for movement therewith and arranged so as to engage and hold said closure member in its closed position when said handle is in its normal position and to release said closure member for movement to its open position when said operating handle is moved toward its operated position.

3. A tube squeezer as defined in claim 2 further characterized by means for biasing said operating handle toward its normal position.

4. A tube squeezer as defined in claim 3 further characterized by said closure member and said latch member including two cooperating surfaces located one on each of said members and which surfaces are coengageable during movement of said closure member to its closed position to move said operating handle slightly away from its normal position and against the force of its biasing means to permit said latch member to be returned to holding relationship with said closure member without need for the operator directly manipulating said operating handle.

5. A tube squeezer as defined in claim 2 further characterized by said closure member including an opening for receiving the outer end portion of said spout when said closure member is in its closed position, and a pad of resiliently compressible material contained in said opening for engaging and sealing said spout when said closure member is in its closed position.

6. A tube squeezer as defined in claim 2 further characterized by said closure member comprising a flat plate having an aperture passing therethrough, a cup-shaped part secured to the outer surface of said flat plate with its recess in general alignment with said aperture so that said aperture and said recess define a common opening in said closure member for receiving the outer end portion of said spout when said closure member is in its closed position, and a pad of resiliently compressible material contained in said opening for engaging and sealing said spout when said closure member is in its closed position.

References Cited by the Examiner
UNITED STATES PATENTS 2,085,673    6/1937    Roache _____ 222—96

FOREIGN PATENTS 625,690    4/1927    France.

EVERETT W. KIRBY, *Primary Examiner.*